June 19, 1934.  C. G. WOOD  1,963,187

CLUTCH PLATE

Filed Oct. 23, 1931

INVENTOR.
Clarence G. Wood
BY
Fay, Oberlin & Fay
ATTORNEYS.

Patented June 19, 1934

1,963,187

UNITED STATES PATENT OFFICE 1,963,187

CLUTCH PLATE

Clarence G. Wood, Cleveland, Ohio

Application October 23, 1931, Serial No. 570,556

2 Claims. (Cl. 192—68)

The present invention, relating as indicated to clutch plates, is more particularly directed to a new and improved drive plate for use in a clutch of the general type employed in motor driven vehicles, for example, and a principal object of the invention is the provision of simple and inexpensive means for absorbing minor variations in the torque transmitted through the drive plate and to compensate for slight misalignment between the motor and the transmission.

To the accomplishment of the foregoing and related ends, said invention, then, consists of the means hereinafter fully described and particularly pointed out in the claims; the annexed drawing and the following description setting forth in detail one product exemplifying my invention, such disclosed product constituting, however, but one of various applications of the principles of my invention.

In said annexed drawing:—

Figure 1:
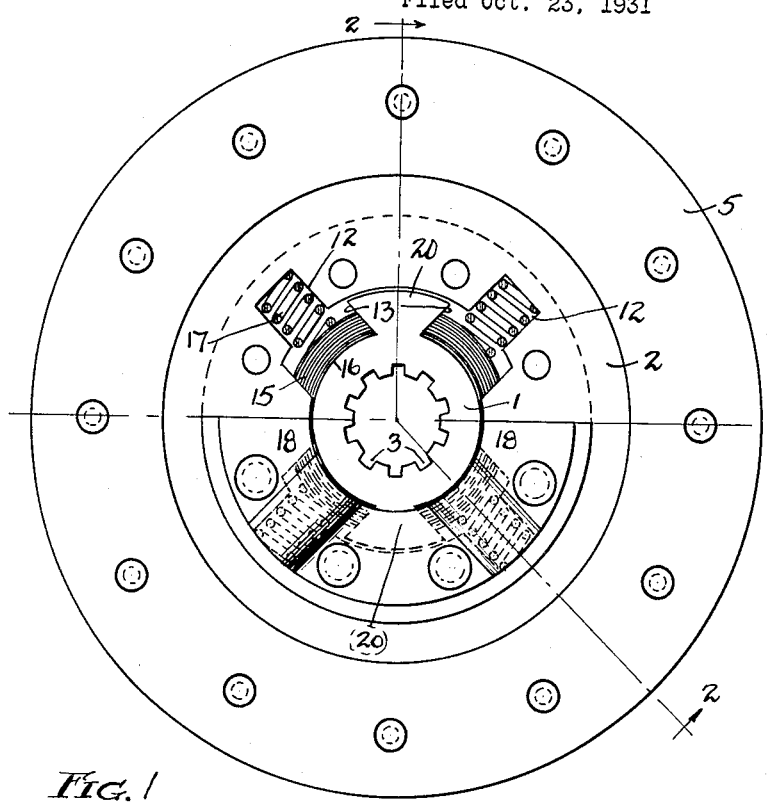
Figure 2:
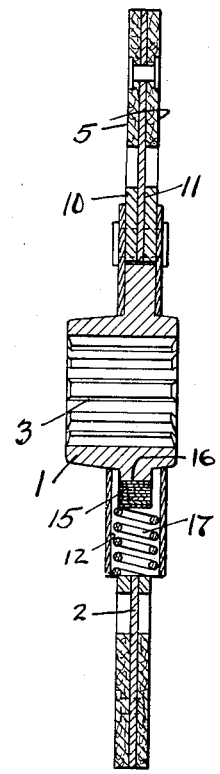
Figure 3:
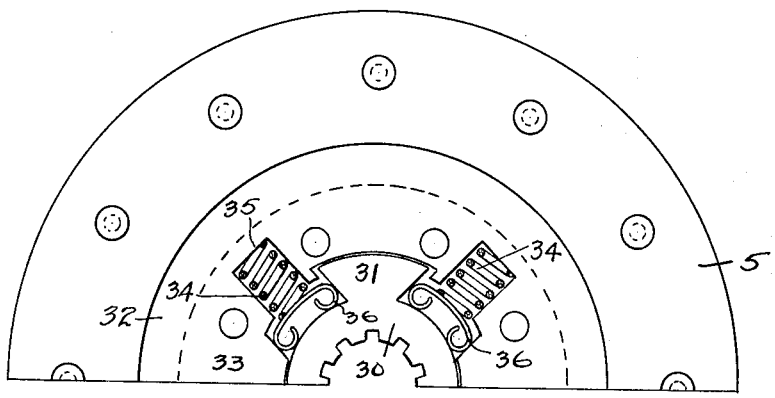

Fig. 1 is a side elevation of my improved clutch plate; Fig. 2 is a transverse section through the same on the line 2—2, Fig. 1; and Fig. 3 is a view similar to Fig. 1 showing a modified construction.

Referring now to Figs. 1 and 2, the clutch plate comprises driving and driven members 1 and 2, respectively, of which the driven member 1 is in the form of a hub provided with a plurality of keyways 3 adapting it to fit over a suitable driving shaft (not shown). The driving plate 2 is provided with friction facings 5, adapting it to engage between or against other clutch elements (not shown) in the usual way.

The plate 2 is provided with members 10 and 11 secured on opposite sides of the plate and provided with sockets 12 in the form of radially disposed recesses open at their radially inner ends, where they register with corresponding recesses 13 in the driven member 1.

My improved means for transmitting the driving force from the driving plate 2 to the driven member 1 consists of a plurality of thin arcuate springs 15 removably mounted against the arcuate shaped bottom 16 of the recess 13 and there held by means of coil springs 17 disposed in the openings 12 in the outer plate 2. The outer plate 2 is provided with two inwardly extending lugs 18 disposed diametrically opposite to each other and the parts are so assembled that these lugs normally lie between the radially outward extending portions 20 on the driven hub 1.

In operation the drive is transmitted by the extending lugs 18 of the drive plate to the leaf springs 15, these leaf springs pressing circumferentially against the extensions 20 on the driven member 1. By the disposition and arrangement of the portions 18 and 20 a drive in either direction is secured. The endwise or circumferential pressure on the springs 15 cause the latter to bend outwardly, compressing the springs 17 in the recesses 12. The springs 17 are of considerable strength and resist the outward bending or shortening of the springs 15, but a sufficient shortening of the springs 15 is permitted and is so controlled, both by their own resistance and the resistance of compression of the springs 17, that a slight absorbing of the torque of the driving member is secured. Minor variations in the driving torque are thus absorbed and a much smoother driving action between the driving and driven members is secured.

In Fig. 3 I have shown a modification of the construction described, in which the driven member 30 is provided with the same diametrically opposed radially extending driving portions 31 and the driving member 32 is provided with the same inwardly extending projections or driving lugs 33. Disposed in recesses 35 in the driving member are coiled springs 34 which engage against bow-shaped springs 36 mounted between the driving and driven faces on the radial lugs 31 and 33, respectively. Rotation of the driving member compresses or bends radially outward the springs 36, which action is resisted by the compression springs 34. The drive is thus transmitted through the joint opposed action of the coiled springs 34 and bow-springs 36 in the manner previously described.

It will be obvious that various other modifications of the constructions above shown may be employed to give a torque absorbing driving relationship between driving and driven elements and that the types which I have shown are simple in construction and convenient of assembly.

Other modes of applying the principle of my invention may be employed instead of the one explained, change being made as regards the product herein disclosed, provided the means stated by any of the following claims or the equivalent of such stated means be employed.

I therefore particularly point out and distinctly claim as my invention:—

1. In a clutch plate, the combination of a disc member, a hub member positioned centrally of said disc member, radially extending projections on said hub member and disc member, said projections having driving faces mutually opposed to each other in spaced relationship, a plurality of leaf springs mounted circumferentially between said driving faces, and resilient means limiting the degree of flexing of said leaf springs.

2. In a clutch plate, the combination of a disc member, a hub member positioned centrally of said disc member, radially extending projections on said hub member and disc member, said projections having driving faces mutually opposed to each other in spaced relationship, a plurality of leaf springs mounted circumferentially between said driving faces, and radially disposed coiled springs engaging said leaf springs and limiting the degree of flexing of said leaf springs.

CLARENCE G. WOOD.